W. BLACK.
RESILIENT WHEEL.
APPLICATION FILED JULY 1, 1911.
1,030,227.
Patented June 18, 1912.
2 SHEETS—SHEET 1.
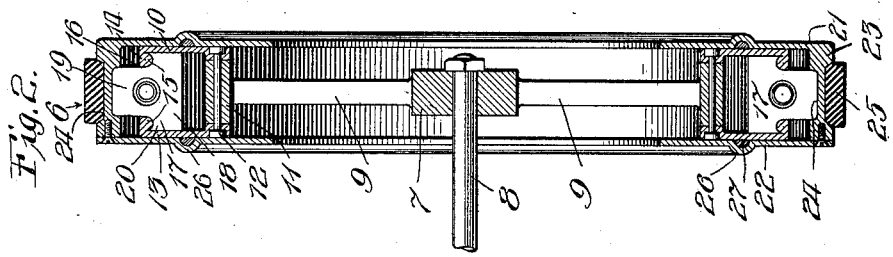
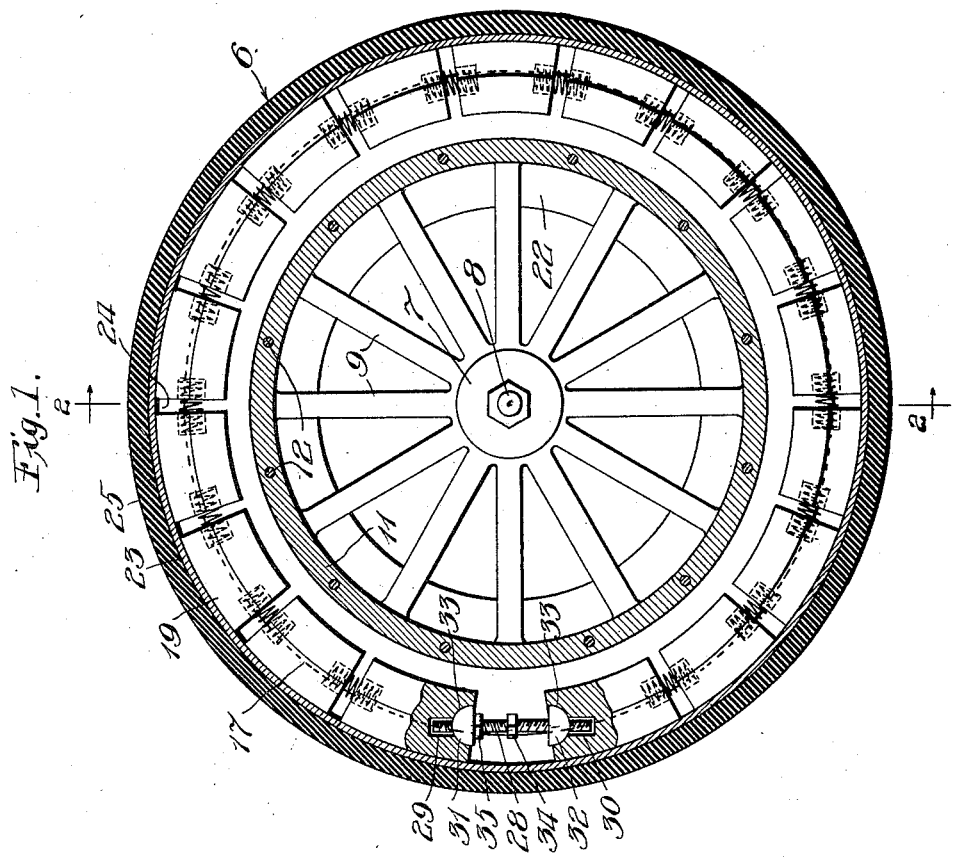
Witnesses:
Inventor:
Walter Black W. BLACK.
RESILIENT WHEEL.
APPLICATION FILED JULY 1, 1911.
1,030,227.
Patented June 18, 1912.
2 SHEETS—SHEET 2.
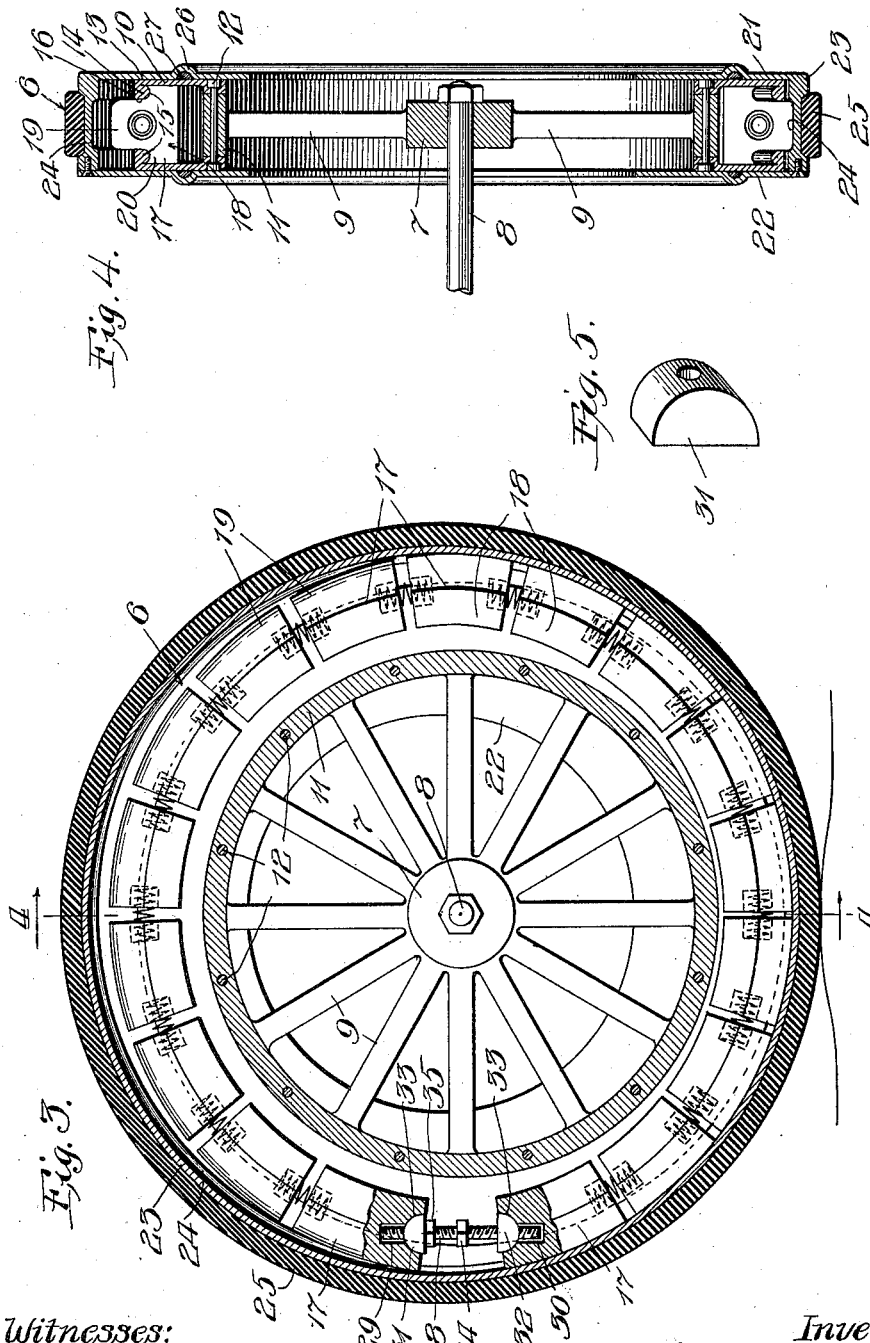

UNITED STATES PATENT OFFICE.

WALTER BLACK, OF MENDOTA, ILLINOIS.

RESILIENT WHEEL.

1,030,227.  Specification of Letters Patent.  Patented June 18, 1912.

Application filed July 1, 1911. Serial No. 636,413.

*To all whom it may concern:*

Be it known that I, WALTER BLACK, a citizen of the United States, residing at Mendota, in the county of Lasalle and State of Illinois, have invented certain new and useful Improvements in Resilient Wheels, of which the following is a specification.

The present invention relates to a type of wheel based on the principle disclosed in my application Serial No. 590,841, filed November 5, 1910, for wheels.

One of the primary objects of the present invention is to arrange means for maintaining the blocks in circumferential alinement with one another and in centralized relation to the tread of the wheel and the chambered rim in which the blocks are mounted. And another primary object of the invention is to provide means for guiding the blocks during their sliding movement, whereby they remain in a state of alinement with one another during such sliding movement, and whereby any undesirable local disturbances in the blocks during their movement are eliminated.

Further objects of the invention are, to provide means for adjusting the initiatory or normal strength of the resilient member which is interposed between the blocks; and to provide a packing between the tread and rim, whereby the entrance of dirt or other undesirable matter into the interior of the wheel is eliminated.

The invention further consists in the features of construction and the combination of parts hereinafter described and claimed.

In the drawings, Figure 1 is an elevation partly in section, showing the blocks in normal position; Fig. 2, a cross section on line 2—2 of Fig. 1, looking in the direction of the arrow; Fig. 3, a view similar to Fig. 1, showing the position which the blocks assume when the wheel is subjected to a shock or jar; Fig. 4, a section on line 4—4 of Fig. 1, looking in the direction of the arrow; and Fig. 5, a perspective of one of the blocks comprising a portion of the adjusting mechanism.

The principle of operation upon which the wheel of the present invention is based is fully set forth in my application Serial No. 590,841, heretofore referred to, and a detailed explanation of this principle of operation is not deemed necessary at this time. It will be briefly stated, however, that it consists in employing a series of blocks circumferentially arranged about the axle of the wheel, and between the blocks is interposed a tension member also circumferentially arranged. An outer tread member surrounds the blocks, and when an obstruction is encountered, the resultant shock forces the tread member inward, thereby sliding the blocks inwardly toward the axle of the wheel and toward each other, whereby a compression of the resilient members interposed between the blocks lying at the lower part of the wheel is produced, and the strain of the jar is thus absorbed and is not transmitted to the axle.

The present invention deals with certain improvements and additions to the structure disclosed in my prior application, and one of the principal features of the present invention lies in the construction and arrangement of the operative parts of the wheel, whereby during the movement of the blocks, said blocks are maintained in centralized relation with respect to the tread and the rim of the wheel, and in a condition of circumferential alinement with one another. This maintains the blocks in a relation to one another whereby a true compressing action of the compression members results and any torsional or twisting strains upon said compression members are eliminated. If the blocks are not held in a practically perfect condition of alinement, a local disturbance in some of the blocks will take place, which would break the continuity of compression exerted by the compression members upon the blocks around the lower portion of the wheel and thus render the device imperfect of operation.

Another feature of the present improved structure which is deemed to be of material importance is the provision of means whereby the initiatory or normal tension of the resilient members interposed between the blocks can be adjusted. By the provision of this means, the wheel can be adjusted to accommodate itself to vehicles of a lighter or heavier draft in a simple and quick manner, and without a removal or interchanging of any of the parts.

In the drawings illustrating my invention, there is shown a wheel 6, consisting of the usual hub 7, surrounding an axle 8; and extending from the hub are a series of spokes 9. The spokes are connected to a chambered rim 10, comprising a circumferentially extending band-like member 11, which is secured by bolts 12 to oppositely positioned plates 13. Each of the plates 13 terminates, at its upper end, in an inwardly extending flange 14, which has the inner face thereof configured to form a bead 15. As will be seen, the flanges 14 are spaced apart from one another, so as to leave a circumferentially extending opening 16 in the upper face of the rim section; and the space between the flanges and the circumferentially extending portion 12 provides a chamber in which are mounted a series of blocks 17.

Each of the blocks which comprise the series of blocks of the wheel of the present invention is alike in construction, and consists of a body portion 18 terminating in a reduced upper portion 19, the juncture of the reduced and enlarged portions producing shoulders 20, which are grooved to conform to the configuration of the bead 15. The groove and bead produce a means for maintaining the blocks in centralized relation with respect to the rim, and the bead further provides a trackway upon which the shoulders of the blocks slide during the movement of the blocks to and from one another, whereby said blocks are maintained in a condition of alinement during their movements. This trackway is what may be termed an inner trackway for the blocks.

The tread member consists of a casing-like member 21, which is closed upon one side by a separable plate 22. The inner face of the outer or circumferential portion 23 of the tread member is formed with a groove 24, and the upper face of the blocks is configured to engage with said groove. This groove maintains the blocks in centralized relation to the tread member and is what may be termed an outer trackway for the blocks, which coöperates with the inner trackway heretofore referred to, to maintain the blocks in centralized relation to one another. It is understood that the blocks are not in continual engagement with both of these trackways. This point can probably be more clearly understood by referring to Figs. 3 and 4 of the drawings, in which it will be seen that the lower or compressed set of blocks are held in centralized relation to the tread member through the medium of the groove 24, and that these grooves at this time perform the function of maintaining the blocks in a substantially accurate condition of circumferential alinement. And it will be further seen from a study of the above referred to figures that the upper or non-compressed set of blocks are held in a condition of alinement with one another through the medium of the beads on the inwardly extending flanges 14.

It will thus be seen that one or the other of these trackways is in constant engagement with the blocks, so that the blocks at no time are in a floating or freed condition whereby torsional strains to which the wheel is constantly subjected could twist the blocks and throw them out of a condition of circumferential alinement. This is deemed to be a very important point, since if one or more of the blocks were thrown out of a condition of circumferential alinement with the remainder, the spring between the blocks thus thrown and the remainder of the blocks would be flexed or bent, and not compressed, and hence the cushioning action would be entirely eliminated at this point of the wheel and the continuity of compression broken, which would impair, if not totally destroy, the desired action of the wheel.

The outer face of the tread member may, if desired, be provided with some suitable sound deadening substance, as a block of rubber 25. It is understood, however, that this substance is used solely for the purpose of eliminating the racket which would otherwise be occasioned by the metallic tread running upon the road. It is not for the purpose of absorbing any of the shock and need not be necessarily of a substance which is of a shock-absorbing nature. The side walls of the tread member are provided with circumferentially extending grooves 26 adapted to receive packing 27 of a nature to prevent the ingress of dust or other undesirable matter into the interior of the wheel. This packing should be of a nature so that it will not impede or interfere with the sliding of the tread upon the rim.

In order to adjust the initiatory tension upon the blocks, I employ a rod or bar 28, best shown in Figs. 1 and 3, and this rod or bar is provided with screw-threaded surfaces 29 and 30, one of which is a left hand thread and the other a right hand thread. These screw-threaded surfaces are in engagement with block-like members 31 and 32 respectively, which are seated within recesses 33 on the ends of the adjacent blocks 17. The members 31 and 32 are entered within the blocks 17, so that they can rock or turn about a pivotal center within said blocks, but are held in the blocks against rotative movement with respect to the rod 28. As shown in the drawings, this adjusting mechanism is of a substantially large nature, but in practice this can be made of a proportion so that the space it occupies will be relatively small, and it will not constitute a sufficient break in the series of blocks 17 so that if a jolt should occur at the point where the adjusting mechanism is located, it would not be properly transmitted to the remainder of the blocks.

The stem or rod 28 is provided with a fixed nut 34 and with an adjustable lock nut 35. Obviously, by a manipulation of the rod 28, the blocks 31 and 32 can be drawn toward or forced away from one another, thus permitting all of the blocks 17 of the series of blocks to be normally held in a more contracted or expanded relation to one another, as desired. When the wheel is applied to a vehicle of a substantially heavy load, the blocks will be adjusted so as to be brought into closer engagement with one another than when the vehicle is of the type having a relatively light load. Obviously, as the blocks are contracted, the tension of the resilient member between them will be increased, and hence the initiatory spring tension upon the blocks will be greater, and the blocks will be capable of sustaining a heavier load without moving from their normal position.

The principle of operation of the device of the present invention is similar to that described in conjunction with my application No. 590,841, but briefly is as follows: When the tread section encounters an obstruction, it moves to the position shown in Fig. 3. The blocks below the axial center of the wheel are slid toward said center, and consequently toward one another. This compresses the resilient members interposed between said blocks and effects a cushioning action, so that the jar or jolt resulting from the striking of said obstruction is absorbed by these members. During the movements of the blocks incident to the movement of the tread members, they will be maintained in a condition of circumferential alinement with one another, and in centralized relation to the tread and rim through the medium of trackways produced by the beads 15 and the groove 24. After the obstruction has been passed, the compressed springs will exert an action to force the blocks outward, and thus restore the tread member to its normal condition and allow the blocks to assume the relation to one another which is shown in Fig. 1 of the drawings.

By maintaining the blocks in the condition of alinement heretofore referred to, and by eliminating all local disturbances of the blocks during their movements, the resultant noise of operation is reduced to a minimum degree.

I claim:

1. A wheel, comprising a channeled rim held against diametrical movement with respect to the axle of the wheel, a series of circumferentially arranged blocks slidably mounted in said rim and adapted to have a movement toward each other and toward the axle of the wheel, said rim terminating in inwardly extending flanges, said blocks having shoulders adapted to engage said flanges, said shoulders having grooves adapted to engage with the lower faces of said flanges, whereby said blocks are held in centralized position with respect to the rim, and in a condition of circumferential alinement with one another, the inner face of the tread having a groove therein, the outer face of the blocks being configured to engage said groove, whereby the blocks are centralized with respect to the tread and maintained in a condition of circumferential alinement, and a circumferentially extending tension member between said blocks tending to force them apart, substantially as described.

2. A wheel, comprising a channeled rim held against diametrical movement with respect to the axle of the wheel, a series of circumferentially arranged blocks slidably mounted in said rim and adapted to have a movement toward each other and toward the axle of the wheel, said rim terminating in inwardly extending flanges, said blocks having shoulders adapted to engage said flanges, said shoulders having grooves adapted to engage with the lower faces of said flanges, whereby said blocks are held in centralized position with respect to the rim, and in a condition of circumferential alinement with one another, the inner face of the tread having a groove therein, the outer face of the blocks being configured to engage said groove, whereby the blocks are centralized with respect to the tread and maintained in a condition of circumferential alinement, a circumferentially extending tension member between said blocks tending to force them apart, and means for adjusting the initiatory strength of the tension members, substantially as described.

3. A wheel, comprising a channeled rim, a hub, and connections therebetween, all held against diametrical movement with respect to the axle of the wheel, a series of unattached blocks arranged in said rim to have a movement toward one another and toward the axle of the wheel, shock-absorbing mechanism consisting of a series of springs arranged circumferentially of the axle of the wheel, and interposed between said blocks said springs tending to hold said blocks away from one another and outwardly projected from the axle of the wheel, and a continuously extending tread member overlying said blocks and movable diametrically with respect to the axle of the wheel, the inner face of said tread member being configured to provide a trackway adapted to receive the outer face of said blocks to maintain the blocks in centralized position with respect to the tread member, and maintain them in such position during their movement circumferentially of said tread member, substantially as described.

4. A wheel, comprising a channeled rim, a hub, and connections therebetween, all held against diametrical movement with respect to the axle of the wheel, a series of unattached blocks arranged in said rim to have a movement toward one another and toward the axle of the wheel, shock-absorbing mechanism consisting of a series of springs arranged circumferentially of the axle of the wheel, and interposed between said blocks to normally hold said blocks away from one another and outwardly projected from the axle of the wheel, a continuously extending tread member overlying said blocks and movable with respect to the axle of the wheel, and a trackway on the rim member, the surface of the blocks being configured in correspondence with said trackway, said trackway serving to maintain the blocks in centralized position with respect to the rim and maintain them in such position during their movements circumferentially of the rim, substantially as described.

5. A wheel, comprising a channeled rim, a hub, and connections therebetween, all held against diametrical movement with respect to the axle of the wheel, a series of circumferentially arranged unattached blocks mounted in said rim to move toward each other and toward the axle of the wheel, resilient members interposed between said blocks, said members extending circumferentially of the wheel, and tending to force said blocks away from one another and outwardly from the axle of the wheel, a continuously extending tread overlying said blocks and movable with respect to the axle of the wheel, and outer and inner configured trackways for the blocks, holding said blocks during their sliding movements upon the tread and rim in centralized position with respect to the tread and rim, and in circumferential alinement with one another, said blocks being configured in correspondence to the configuration of the trackways, substantially as described.

6. A wheel, comprising a chambered rim, a hub, and connections therebetween, all held against diametrical movement with respect to the axle of the wheel, a series of blocks mounted in said rim and adapted to have a movement toward one another and toward the axle of the wheel, circumferentially arranged tension members interposed between said blocks, and tending to force said blocks apart and hold them outwardly projected from the axle of the wheel, a tread member surrounding said blocks, and movable diametrically with respect to the axle of the wheel, and means for adjusting the normal compression of said tension members by sliding the blocks to adjust the spacing therebetween, substantially as described.

WALTER BLACK.

Witnesses:
Wm. P. Bond,
John Black.

---

Copies of this patent may be obtained for five cents each, by addressing the "Commissioner of Patents, Washington, D. C."